Patented May 15, 1934

1,959,149

UNITED STATES PATENT OFFICE 1,959,149

COLORABLE CERAMIC COMPOSITION AND PROCESS FOR UTILIZING THE SAME

Arthur E. Baggs and Edgar Littlefield, Columbus, Ohio

No Drawing. Application December 31, 1931, Serial No. 584,280

2 Claims. (Cl. 91—72)

This invention relates to the production and control of color effects in ceramic glazes, or in glass, in respect to those colors which are obtained during heat treatment through chemical reduction of certain metallic oxides or compounds from a higher to a lower oxygen content. An object thereof is to make possible the production of such colors and their control within prescribed areas without special manipulation of kiln or furnace atmosphere, thereby greatly simplifying such production and increasing the possibilities for practical use of such colors, especially in combination with other colors which are harmed by reducing atmosphere.

Among the ceramic glazes most prized by collectors and others are certain color effects of this character. Perhaps the best known example is the famous "ox-blood red" of the Chinese potters. This color is derived from copper which in ordinary oxidizing or in neutral kiln conditions gives green or blue but in reducing kiln atmospheres, produces red. To obtain glazes of this red color, it has been considered necessary to maintain a reducing atmosphere in the kiln during at least a part of the firing or cooling period. This condition limits the use of such colors and especially their production in combination on the same piece, in the same sagger or even in the same kiln, with other colors which would be changed or destroyed by a reducing atmosphere.

The present invention provides a process by which such colors, depending on chemical reduction, may be produced in the ordinary oxidizing or neutral kiln without a special atmospheric control; also, a method by which the characteristic colors from a given metallic oxide under oxidizing and reducing conditions may both be combined on the same piece of ware in controlled areas, without detriment to each other or to other colors in the same kiln or heating zone. In other words, the invention provides a means for maintaining strictly localized reducing conditions where such conditions are desired without any manipulation of the general atmospheric conditions within a kiln.

Specifically, the present invention consists of the incorporation of a carefully adjusted quantity of any suitable reducing agent in a glaze, glass, ceramic body, slip or other coating to be used under a glaze, or in a coating, glaze or stain to be applied over a glaze. The purpose of the aforementioned additions of reducing agents to glazes, glasses, bodies, slips or other portions, both under glaze and over glaze, being to cause the development in the finished product during firing treatment in ordinary kiln or furnace conditions of colors characteristic of reduction.

While we do not in any way limit our claims herein to the specific materials or colors of glaze named as examples, we may state for the sake of clarity in description that, in proper proportions, silicon carbide (carborundum) incorporated in any of the ways above mentioned will react locally with a glaze containing a metallic oxide having two or more stages of oxidation, such as copper, and will develop the characteristic red color of reduced copper glazes. This is true although the ware may be burned in oxidizing or in neutral kiln atmospheres. Other reducing agents may be used such as lampblack or graphite. We refer to silicon carbide hereinafter as a "reducing agent" since we have observed that this material functions in such a capacity when used in accordance with the teachings of the present invention. Therefore, by the expression "reducing agent", as used hereinafter, we refer to silicon carbide or its equivalent in the present process.

A glaze having the following composition will produce a copper red in ordinary kiln conditions:

|  | Parts |
|---|---|
| Feldspar | 35..6 |
| Borax | 16.0 |
| Whiting | 8.5 |
| Kaolin | 11.0 |
| Powdered sodium silicate | 5.5 |
| Flint | 23.4 |
| Total | 100.0 |
| Carborundum | 1.0 |
| Tin oxide | 1.0 |
| Copper carbonate | 0.3 |

A glaze the same as the above except for the omission of silicon carbide, produces a light bluish green when burned under ordinary kiln conditions and atmospheres. These glazes are usually burned at a temperature of substantially 2280° F. This red glaze applied in certain areas, either adjacent to or superimposed upon a similar glaze containing no silicon carbide, will produce on the same piece red areas and light blue green areas without detriment to either color.

An example of the use of silicon carbide in a slip for use under a glaze may consist of the ordinary white earthenware body to which has been added two per cent. of silicon carbide. This will produce a copper red when covered by the above mentioned glaze omitting silicon carbide, and when burned to a temperature of 2280° F. in ordinary kiln atmospheres.

An example of the use of silicon carbide in an over glaze stain may be composed of:

| | Parts |
|---|---|
| Flux #8 (a soft commercial flux) | 100.0 |
| Tin oxide | 2.0 |
| Silicon carbide | 1.0 |
| Copper carbonate | 0.3 |

An over glaze color of the above composition may be applied by brush, spray or printing upon the surface of fired glaze and burned at a suitable temperature in ordinary kiln atmosphere to produce a red color.

In view of the foregoing, it will be seen that the present invention provides a process for producing a glaze which is colored by the introduction therein of a metallic oxide or compound and having the characteristic color which ordinarily results from burning such a glaze in a reducing fire; in this instance, however, the glaze is burned in ordinary oxidizing or neutral kiln conditions and depends for its color effect upon the incorporation within the glaze or in contact with the glaze of the desired reducing agent, which reacts locally without reference to the general kiln atmosphere. The process is simple and convenient to carry out and permits of the production of ornamental effects on ceramic or glass ware of an improved character and which by the practice of ordinary methods have been impossible to attain.

By the expression "ordinary kiln atmospheres", we refer to the atmospheres maintained in the customary operation of ceramic kilns and not to special atmospheres such as reducing atmospheres. While we have stated that the silicon carbide reacts locally with the copper compound, it will be understood that we are not attempting to state that these compounds react directly—the reaction may be indirect. The chemical equations are complicated and hypothetical, therefore, we do not limit ourselves to any theory with respect to the reactions which take place but know as a fact that the color control or effects can be positively procured with the use of the materials and under the conditions above specified. By the expression "metallic oxide", we employ this term in a customary sense and mean to embrace thereby not only oxides but the salts of metals having two or more stages of oxidation.

What is claimed is:

1. The method of coloring the surfaces of ceramic ware which consists in applying coating material to the surfaces to be colored, said coating containing a small percentage of copper oxide and silicon carbide, and burning the ware in ordinary kiln atmosphere thereby causing the silicon carbide to react with the copper oxide to produce a characteristic "copper red" color by the reduction of the copper oxide to a lower stage of oxidation.

2. As a new composition of matter, a decorative coating for ceramic ware, containing silicon carbide and a compound of copper.

ARTHUR E. BAGGS.
EDGAR LITTLEFIELD.